Nov. 25, 1941.    R. H. HILL ET AL    2,263,989
REMOTE RADIO CONTROL
Filed Feb. 4, 1938    7 Sheets-Sheet 1

Nov. 25, 1941.   R. H. HILL ET AL   2,263,989
REMOTE RADIO CONTROL
Filed Feb. 4, 1938   7 Sheets-Sheet 6

Inventors
Robert H. Hill &
Edward M. Claytor
By
Blackmore, Spencer & Hiix
Attorneys Patented Nov. 25, 1941

2,263,989

UNITED STATES PATENT OFFICE 2,263,989

REMOTE RADIO CONTROL

Robert H. Hill and Edward M. Claytor, Anderson, Ind., assignors to General Motors Corporation, Detroit, Mich., a corporation of Delaware Application February 4, 1938, Serial No. 188,596

6 Claims. (Cl. 172—239)

This invention relates to automatic control means and more specifically to means for automatically tuning a radio receiving set from a distance.

In a great many instances it is desirable to change the tuning or setting of a radio receiving set when the operator is at a distance from the main body of the set, such as in cases where the receiving apparatus is mounted in an automotive vehicle, usually on the dash, and the controls have to be brought up to a position adjacent the driver so that he may manipulate the same, or in household installations where the set may be on one side of the room and the persons desiring to tune the same may be seated at a remote point.

In the design of such apparatus it is of course essential to provide the apparatus requiring the smallest amount of manual manipulation and it is therefore the object of our invention to provide means for automatically tuning a set to a predetermined position by merely manipulating a switch at a remote point.

It is a further object of our invention to provide means for automatically tuning a radio set from a remote point also adjusting the setting from the same remote point.

It is a further object of our invention to provide a simple means for carrying out the above objects and one which would be sufficiently foolproof.

With these and other objects in view the embodiments of our invention will be best understood by reference to the following specification and claims and illustrated in the accompanying drawings, in which:

Figure 1:
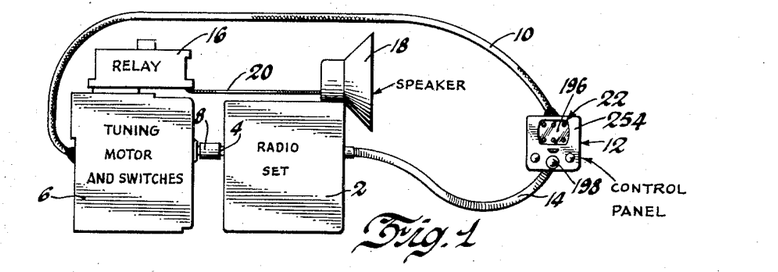
Figure 1 is a schematic diagram showing the various parts of a radio receiving system with our control connected thereto.

Referring now more specifically to the general design shown in Figure 1, 2 indicates a conventional radio set having extending therefrom a shaft 4 upon which the main bank of tuning condensers are secured and which by the rotation thereof the set is tuned. To this is connected the general construction of tuning motor and switches 6, the output shaft of which is coupled to the shaft 4 by a suitable coupling and the rotation of the tuning motor therefor will rotate the bank of condensers to tune the set. Connected to the control mechanism 6 by suitable multiwire cable 10 is a remote control panel indicated generally at 12 which is also connected to the radio set 2 by a Bowden wire control cable 14 for current supply and volume controlling and mechanical tuning, respectively. Mounted adjacent the control tuning motor is a relay assembly indicated generally at 16 which is connected to a loud speaker 18 by a cable 20.

The general construction is designed so that when the control buttons 22 are depressed in the control panel the tuning motor will be energized and rotate its shaft and the condenser shaft of the radio set which is rigidly secured thereto through a predetermined arc to tune the radio set to a new setting and when it reaches that point the motor will be deenergized.

During this operation the relays act to accomplish several features: they open the circuit to the loud speaker so that there will be no noise in the speaker during this period, and also act to maintain a holding circuit for the operating means even though the actuated control buttons 22 are released until the desired tuning point is set, and, lastly, actuate the desired motor switch.

The tuning mechanism may be mounted directly within the confines of the radio set casing or it may be mounted in a separate enclosure or panel adjacent thereto, and for purposes of illustration the latter construction is illustrated here. This tuning assembly 6 is composed generally of a plurality of angular brackets 24 for supporting the desired means. A small motor 25 is supported within the brackets and is composed of field coils 26 and a light rotor 28, its shaft 29 being trunnioned in the bearings 30. The rotor has at one end a commutator 32 which cooperates with a plurality of spring biased brushes 34 which supply the energizing current to the rotor.

The opposite end of the motor shaft has mounted thereon a worm gear 36 which meshes with a worm wheel 38, the latter being mounted below and on a shaft 40 at right angles to the motor shaft. Mounted in spaced relation to the worm wheel and also on the shaft 40 is a second worm gear 42. The shaft 40 then proceeds through a bearing 44 in a portion of the supporting bracket 24 and carries thereon a coupling 46 for connection to the tuning shaft 4. The worm wheel 38 has an elongated hub 43 to act as a spacing member, said worm wheel being rotatably mounted with respect to the shaft 40 so that it may move freely without rotating the latter. The purpose of this relative movement between the worm wheel and the shaft 40 is provided so that the set may be tuned manually which would of course result in the rotation of the shaft 40 inasmuch as it is rigidly connected thereto without the necessity of turning the driving coils and motor. The drive will be more specifically described at a later point.

In parallel spaced relation to the motor shaft is an additional operating shaft 48 which is mounted below the shaft 40 and carries a worm wheel 50 which meshes with the worm gear 42 so that the rotation of the shaft 40 is transmitted directly to the shaft 48. Bracket arms 52 are provided from the base of the bracket and carry therein self-aligning bearings 54 for this shaft 48, said shaft being adapted to carry the control disks for switching purposes. In the settings of the various stations in this type of control it is of course necessary to provide one control disk for each station and while theoretically there is no limit to the number of stations, practically, however, we must limit the number of stations selectable in order to keep the apparatus in reasonable dimensions.

Therefore in the particular design shown there are six selectable stations and for each one of the control buttons in the remote control means there must be a corresponding settable disk on the shaft 48 for switching purposes. There are therefore located on this shaft a series of control disks 56, each of said disks being substantially circular and having an insert 58 of non-electrical conducting material and also at a position diametrically opposite from the midpoint of the insulating arc is a control notch 60, the purpose of which will later be clarified.

These disks 56 are adapted to be frictionally mounted upon the shaft 48 so that they may be angularly adjustable with respect thereto but normally rotate therewith. The detail of this frictional mounting is best disclosed in Figures 11 and 12 and in this instance the shaft 48 is shown with a pair of oppositely disposed keyways 62. Mounted on the shaft are a series of sleeve members 64 which have a substantially large annular flanged portion 65 and a portion 66, smaller in diameter and exteriorly threaded. The control disks 56 are mounted on the smaller diameter and have one side adjacent the annular flange 65.

Spring pressed against one side of the disk 56 and forcing it against the side of the larger diameter of the member 64 is a flexible spring disk 68 which slides over the outer diameter of the threaded sleeve 66 and has two diametrically opposed tongues 70 extending inwardly and adapted to ride in the keyways 62, said sleeve 66 having openings therein through which these tongues may project. Supported on the external diameter of the sleeve 66 and in threaded engagement thereto are a plurality of securing nuts 72 which when tightened tend to press the spring disk 68 with more or less tension against the surface of the control disk 56 thereby varying the friction between the drive shaft 48 and the disk 56.

Figures 9, 10, 11, 12, 13:
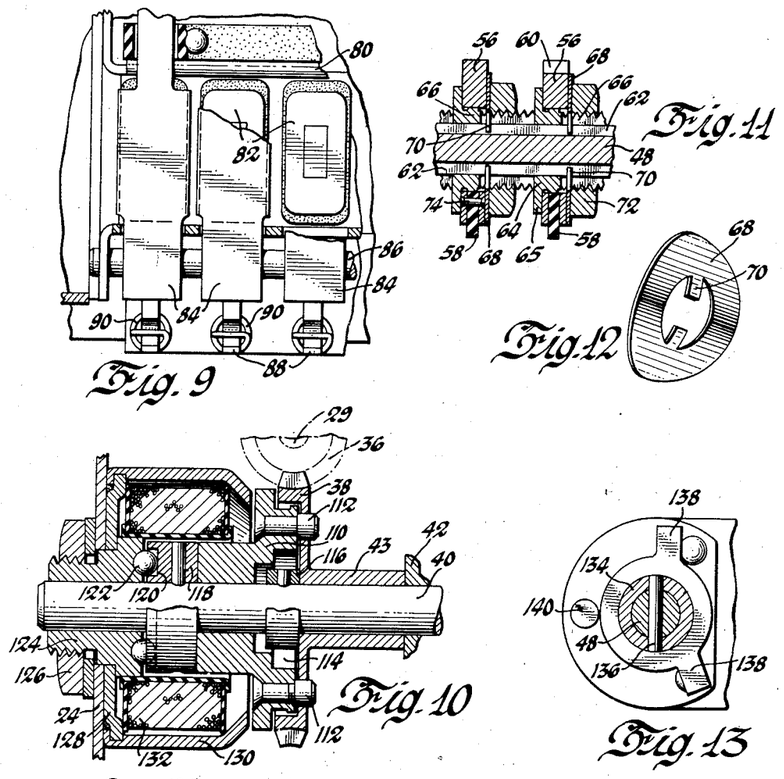
Figure 9 is a sectional view taken on line 9—9 of Figure 5.
Figure 10 is a sectional view taken on line 10—10 of Figure 4.
Figure 11 is a sectional view taken on line 11—11 of Figure 4.
Figure 12 is a perspective detail of one of the washers used in the assembly on the shaft of the control disks.
Figure 13 is a sectional view taken on line 13—13 of Figure 4.
Figure 14:
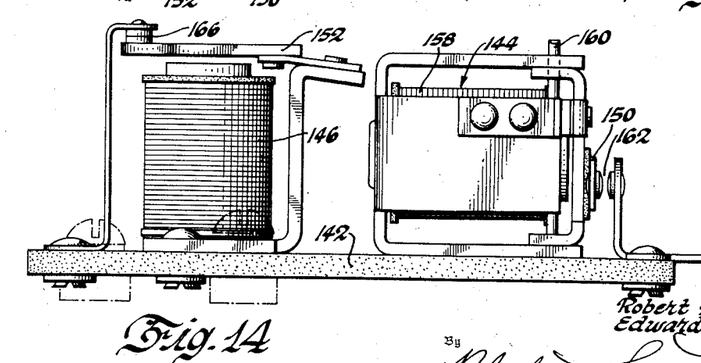
Figure 14 is a side elevation of the control relays taken on the line 14—14 of Figure 15.
Figure 15:
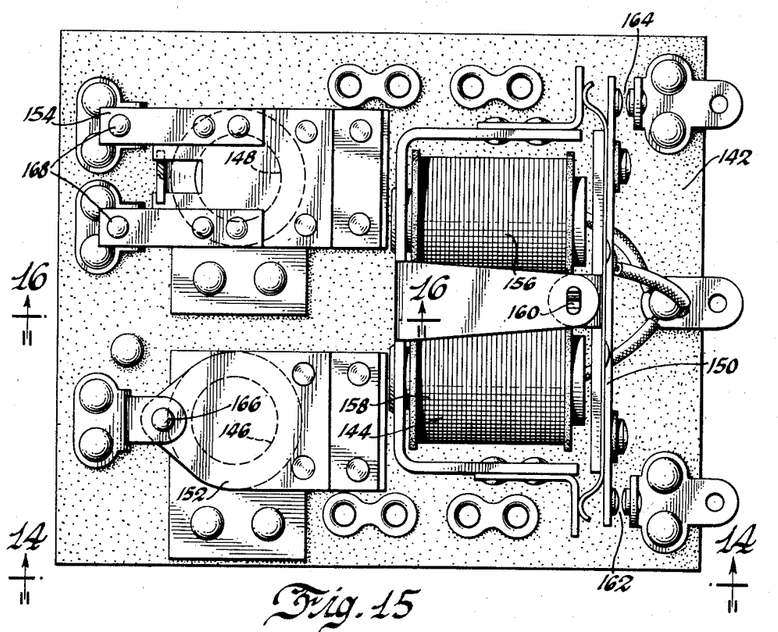
Figure 15 is a top elevation of the control relays.
Figure 16:
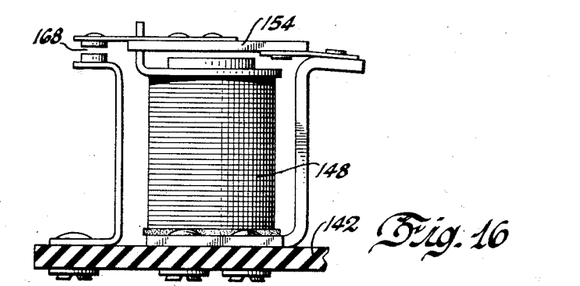
Figure 16 is a sectional view taken on line 16—16 of Figure 15.
Figure 17:
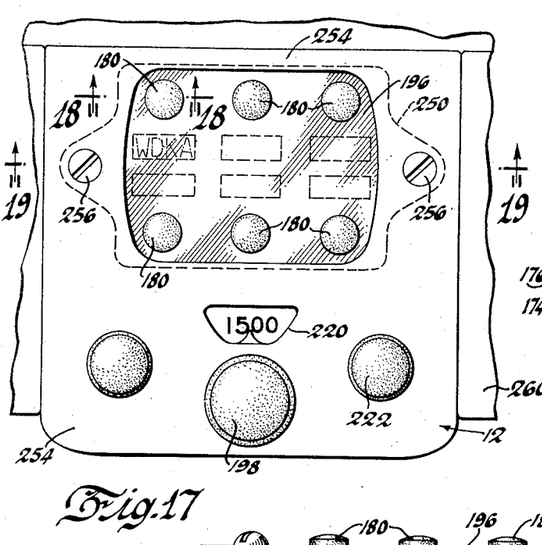
Figure 17 is a top plan view of the remote control box.
Figure 18:
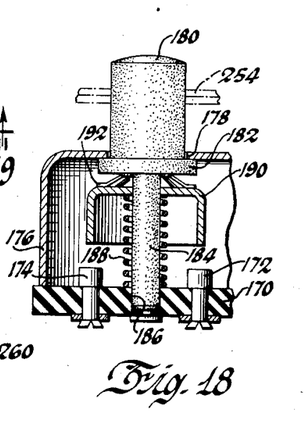
Figure 18 is a sectional view on line 18—18 of Figure 17.
Figure 19:
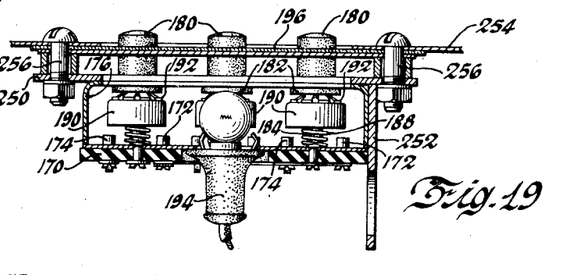
Figure 19 is a sectional view taken on line 19—19 of Figure 17.
Figure 20:
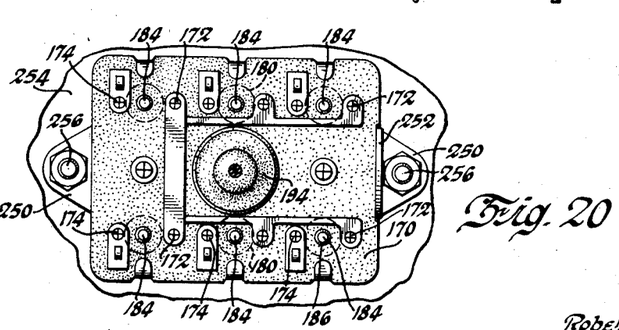
Figure 20 is a bottom plan view of the underside of the plate holding the control buttons.

The detail of the support of the insulating arc 58 within the edge of the disk 56 is best shown in Figure 11 where it is noted that this arc or sector 58 is supported between the two sides of the disk 56 and is held in this position by suitable rivets 74. It is therefore evident from the above construction that the disk normally rotates as the shaft 48 turns, but may, under certain circumstances, be held against rotation when the shaft 48 is rotated.

Figures 5, 6, 7, 8:
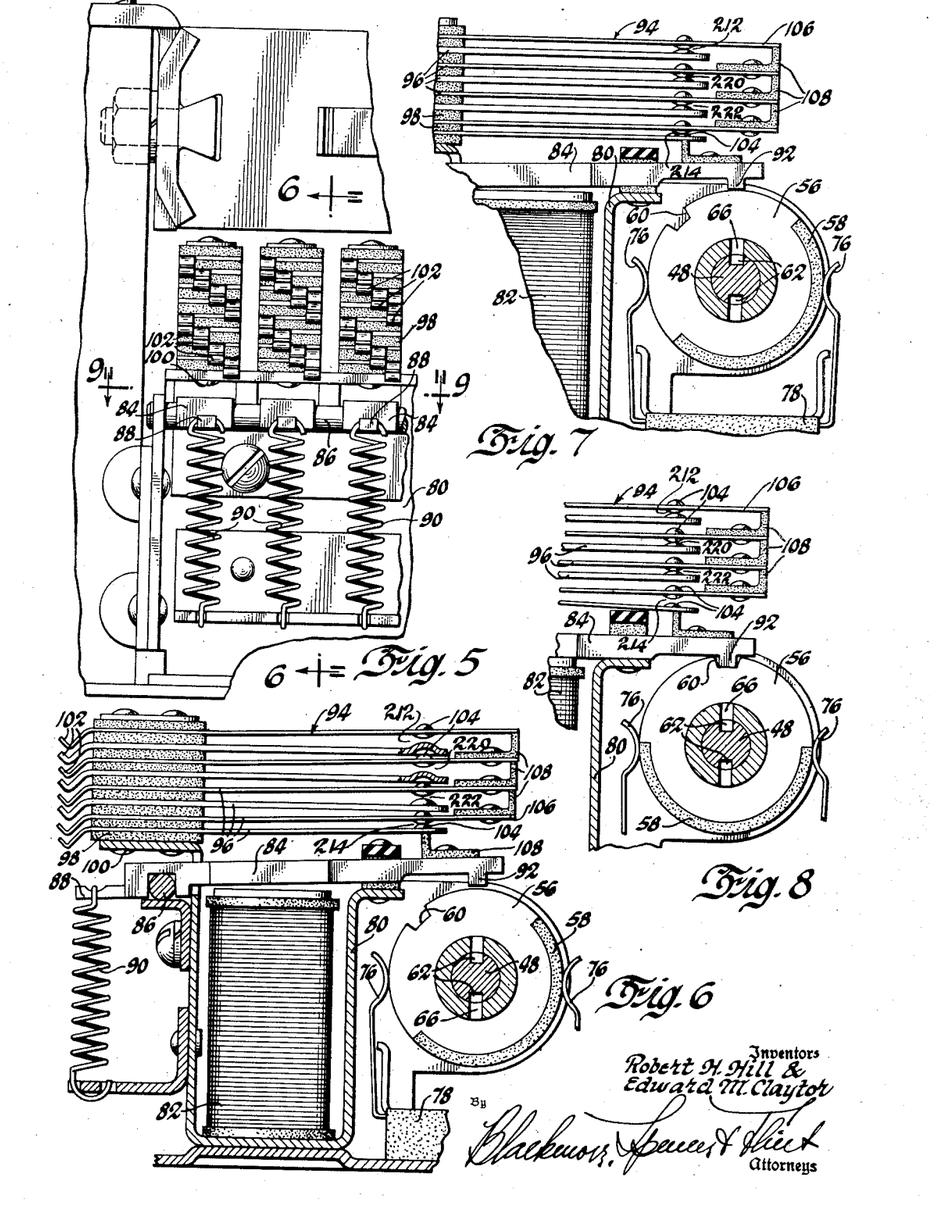
Figure 5 is a partial side elevation of the driving device.
Figure 6 is a sectional view taken on line 6—6 of Figure 5.
Figure 7 is a vertical section similar to Figure 6 showing one of the control disks and the switches controlled thereby.
Figure 8 is a view similar to Figure 7 showing the control disk in a different position.

Cooperating with each one of the disks 56 are a pair of diametrically opposed spring contact arms 76 and, from the various figures, 6, 7 and 8, it is obvious that one of these spring arms will always be in contact with the conducting surface of the control disk 56 with which it is associated, but not both. These spring arms 76 are connected to suitable conductors supported on the insulating base 78 and the connections will be later clarified with relation to the wiring diagram.

Adjacent one side of the shaft 48 is supported a U-shaped bracket 80 within which are carried a plurality of electromagnets 82, one operating in conjunction with each one of the control disks 56. Each of the magnets 82 cooperates with a pivotally movable armature 84, the latter being pivoted around a rod 86 running parallel to the shaft 48. The outer end of the armature 84 is extended, as shown at 88, and has connected thereto one end of a coil tension spring 90, the opposite end of which is connected to the bracket so that the armature is normally biased away from the coil. The opposite end of the armature is provided with a projection 92 which is adapted to cooperate with the notch 60 in the control disk 56 and when the relay coil 82 is energized will cause the projection 92 to ride on the surface of the disk 56 until the notch is reached at which time it will fall thereinto and cause a certain series of switching actions.

Mounted directly above the magnet 82 and its armature 84, and also secured to the same bracket 80, are a series of jack switches 94 similar to telephone jacks which are adapted to be operated by the movement of the armature 84. This bank of switches comprises a plurality of reed springs 96 which are supported alternately between insulating blocks 98, the whole being secured together by suitable rivets 100, the reeds 96 extending on the opposite side of the block and being provided with suitable projections 102 for connection to the desired circuits. On the opposite or movable end of the reed there are provided contacts such as 104 which when the reeds are in a certain position will touch each other, completing certain desired circuits.

Some of the reeds are longer than others, such as those extensions shown at 106, and carry insulating angular blocks 108 which are adapted to contact the next adjacent extended reed so that a plurality of these switches may be actuated in synchronism. The upper face of the armature 84 carries a small angular insulating member 108 which is adapted to contact the lowermost spring reed 96 to perform the necessary switching operations when the armature is moved up or down.

The position of the various switches is well illustrated in Figures 6, 7 and 8, these three figures showing the three possible positions of the armature 84. Figure 6 shows the armature in the magnetically deenergized position with the spring 90 holding the armature in its uppermost position, the lowermost switch closed and the rest open. Figure 7 shows the armature with the magnet 82 energized and pulling the projection 92 down against the surface of the control disk 56 and it is noted in this instance that the relative position of certain of the switches above the armature is changed, all of them in this instance being closed. Figure 8 shows the position of the switches when the projection 92 falls into the notch 60 in the disk and in this it is to be noted that the lowermost switch is open which will later be clarified in that its action deenergizes the system.

The construction illustrated in Figure 10 is that designed to couple the drive from the motor shaft to the shaft 40 so that the rotation of the motor will cause tuning but which will otherwise be free to rotate so that the set may be manually tuned without the necessity of turning the motor and the attendant drive. As before mentioned, the worm wheel 38 is freely rotatable on the shaft 40. There is secured to one face of the wheel 38 a block 110 by suitable machine screws 112, the block 110 having provided adjacent the center a cavity 114 within which is supported a collar 116 which is secured to the shaft 40 and maintains the wheel 38 from much axial movement.

Supported in spaced relation to the collar 116 is a second and larger collar 118 which is also rigidly secured to the shaft and has cut in one face thereof a ball race 120 which houses a suitable plurality of ball bearings 122 which are forced against a face of a bearing member 124 supported in the bracket 24 and which surrounds and acts as a bearing for the end of the shaft 40. Clamped against the bracket 24 by the supporting nut 126 of the bearing, due to the fact that the outer surface of the bearing is recessed, is a disk plate 128 which forms a portion of a suitable housing 130 within which is supported a magnetic coil 132, this whole assembly acting as a magnet clutch, the relative motion or clutch action occurring between the left hand face of the member 110 and right hand face of the collar 118, there being sufficient clearance at this point to allow the member 110 to rotate with respect to the collar 118 if the magnet is not energized. However, when the magnet 132 is supplied with current, it attracts the member 110 toward the left, as shown in Figure 10, forcing the two surfaces above mentioned into close contact and causing their combined rotation.

This is however not true of the worm gear 42, this being rigidly secured to the shaft 40 and rotating at all times therewith so that the relationship between the control disks 56 and the tuning condensers will always remain the same after having once been set. The ordinary range through which it is necessary to rotate a tuning condenser shaft is approximately 180° and therefore in order to provide the necessary limits of rotation there is rigidly secured to the shaft 48 adjacent the left hand end thereof a suitable sleeve member 134 by a pin 136 passing diametrically therethrough, said sleeve member 134 having a plurality of projections 138 which are adapted to cooperate with a stop 140 which is carried by the supporting bracket so that the rotation of this shaft will not be greater than that through which the tuning condensers are intended to rotate.

Supported above the remainder of the apparatus which has been described and carried by the same supporting brackets 24 is an insulating plate 142 which is adapted to carry a plurality of relay means 144, 146 and 148 which by operating their respective armatures 150, 152 and 154, provide suitable switching means for various purposes, the relay 144 operating the motor switches. The said relay 144 is composed of two coils 156 and 158 and operates the armature pivotally about a center point 160 to close either contacts 162 or 164, depending upon which one of the coils is energized and thus determines the direction of rotation of the motor 25 which has a plurality of field coils, one for each direction of rotation.

The relay 146 controls through its armature movement and switch 166 the energization of the loud speaker and, as will be evident from the construction, when the relay coil 146 is energized the circuit will be broken and the speaker will be mute during tuning operations. The remaining relay 148 controls through a pair of switches 168 a holding circuit for the particular relay 82 energized so that the motor will remain energized until the proper position has been reached.

A small remote control panel, such as indicated at 12, is located at some distant point for controlling the automatic tuning which is accomplished by the closure of certain designated switches. This panel 12 has attached thereto an insulated backing plate 170 in which are mounted a plurality of spaced conducting contacts 172 and 174 for each of the push buttons. Mounted adjacent one face of the plate 170 is a hollow pressed casing 176 which has therein a series of openings 178 through which project the push buttons 180, said push buttons being formed of Bakelite or some other insulating material forming a button head, a flanged ring 182 and a stem 184, said stem extending downwardly into an opening 186 in the base in axial alignment with the opening 178 in the casing. Surrounding the stem portion 184 is a helical coil spring 188 which bears against the insulating base 170 and also against the circular contact member 190 which is supported on the stem and has secured to its upper face a plurality of springs 192. As the button is depressed the spring 188 will be compressed forcing the contact member 190 down across the two spaced contact members 172 and 174 to complete the circuit.

Also supported in an opening in a central part of the base is a suitable source of illumination 194. Directly above the central part of the base in which the illuminating means is supported the casing 176 is cut away so that the light may pass through to transparent or translucent means 196 mounted directly above this space for indicating to what station the adjacent push button will tune the set if depressed.

To the top and side of the casing 176 are rigidly secured plates 250 and 252 respectively for supporting purposes. The upper plate 250 is secured to the panel 254 in spaced relation by bolts 256, the panel being provided with openings in alignment with the buttons and transparent illuminating means. The panel may be mounted on any suitable base or support such as indicated at 260.

There is also located in the control panel a rotating tuning knob 198 which is connected through the Bowden wire 14 to manually tune the set and also an indicator is directly geared thereto and visible through the opening 220 to indicate the actual position of the tuning condensers.

There are also provided knobs for volume control and any other desired control, such as 222. This remote panel may be secured in any desired position which will be adaptable for ease in operation.

Figure 2:
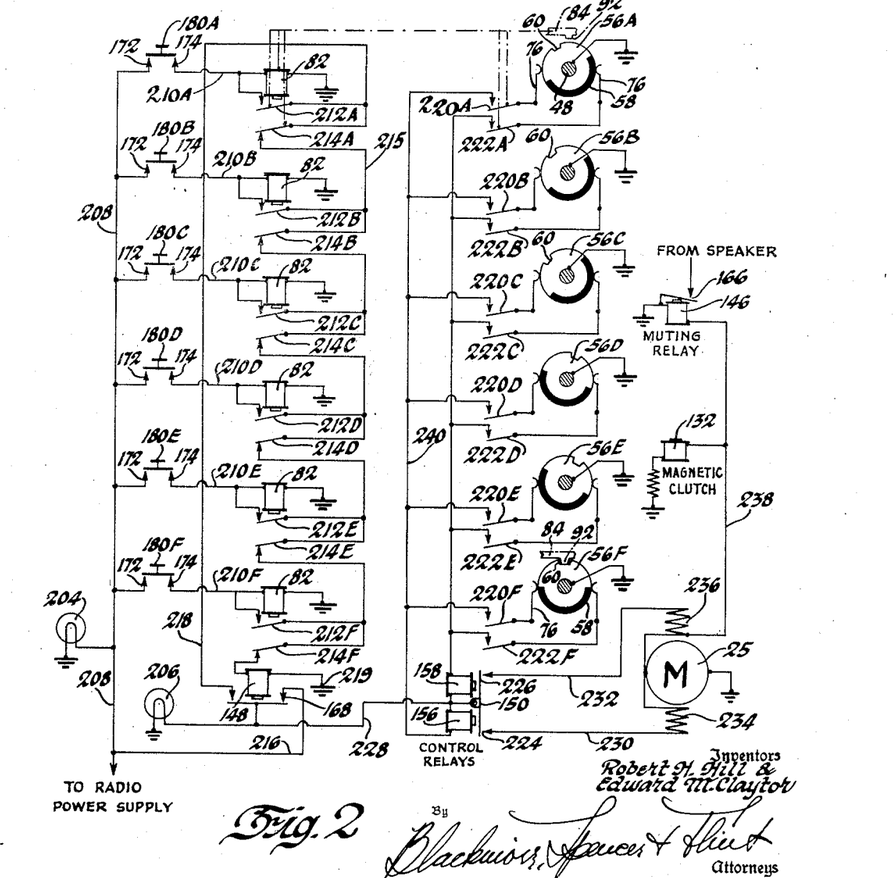
Figure 2 is a schematic wiring diagram of the apparatus embodying our control system.
Figure 3:
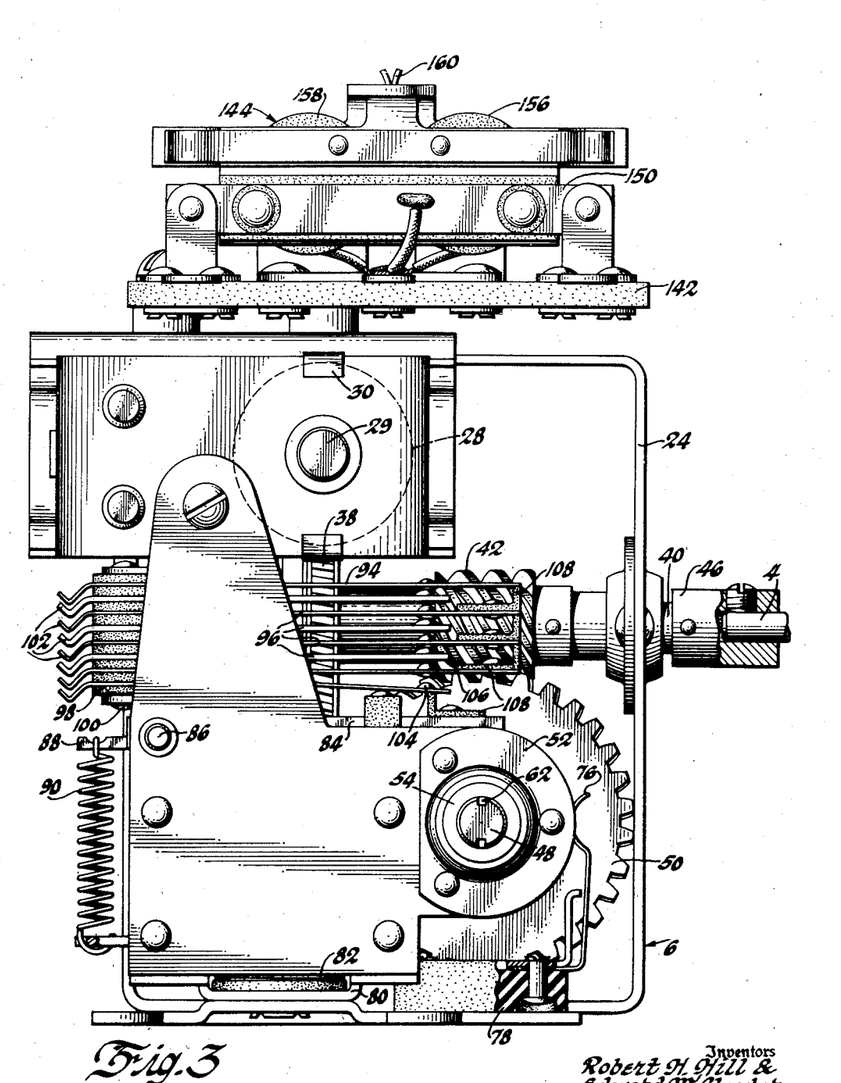
Figure 3 is an end elevation of the mechanical drive for the tuning means.
Figure 4:
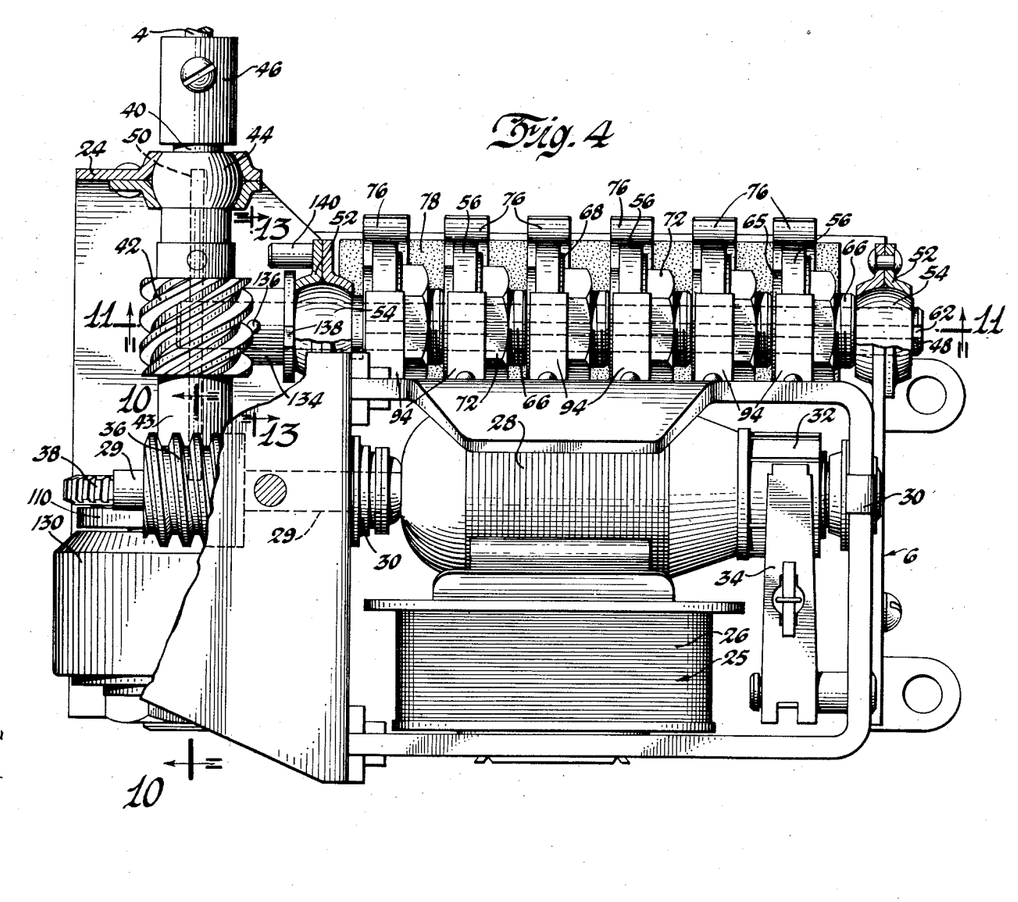
Figure 4 is a top plan view of the device shown in Figure 3.

Referring now more specifically to the wiring diagram shown in Figure 2, there are illustrated a series of control buttons 180A, 180B, 180C, 180D, 180E, 180F, each controlling the operation of a relay coil 82 to close certain desired switches and in combination with each of the first is a rotating control disk 56A, 56B, 56C, 56D, 56E, 56F with which cooperates one of the relay armatures 84.

There is also shown in this circuit the holding relay 148, the motor control relays 156 and 158 which control the tilting armature 150, the tuning motor 25, a magnet 132 for operating the clutch mechanism, and a magnet 146 for controlling the operative periods of the speaker. There are also shown indicating lights such as 204 and 206 for indicating the operative periods of various portions of the apparatus.

A line 208 is connected to the power supply and supplies the automatic tuning arrangement with power. This line is connected to one contact 172 of each of the push button switches 180A—F. The opposite terminals 174 of each of these switches is connected by lines 210A—F to the corresponding magnet 82, each of the magnets operating a switch 212A—F. The incoming line 208 is connected by a short tap line 216 to one terminal of the switch 168, said switch being operated by relay 148. The opposite terminal of the switch 168 is connected to line 218 which is connected directly to switch 212A and 214A closing a holding circuit for its relay coil 82 to maintain the same energized after the push button 180 has been released opening the energizing circuit.

The switch 214A is operated in conjunction with the armature 84 which cooperates with the disk 56A and therefore its position depends upon the position of the rotating cam 56 and is normally closed when the armature 84 is in its deenergized position. The switch 214A is connected by a line 215 to the next adjacent switch 214B which is operated by the armature in conjunction with the rotating disk 56B and 214B is connected in series with 214C, etc. so that all of these switches are connected in series with the holding coil magnet 148, the other side of which has been grounded by line 219. These switches are therefore all normally closed when the tuning device is not set for any predetermined station and when that occurs the switch 214, which corresponds to the control disk desired, is opened to break the circuit.

Tapped from the serially connecting lines between these switches is a lead which connects to the corresponding switch 212 to provide a shunt circuit for the relay 82 which is energized. The position of the armature 84 also controls mechanically the position of two switches 220A—F and 222A—F which are associated with each one of the control disks. These, in combination with the springs 76 which bear against diametrically opposite sides of the control disk, determine which one of the coils 156—158 will be energized since one of these contacts 76 must be in contact with the conducting surface and the other with an insulating surface.

Then if one of the coils 156—158 is energized it will tilt the armature 150 to close either switch 224 or 226 and through lines 216, switch 168, line 228, armature 150 and either one of the switches 224 or 226 and over line 230, 232, either coil 234 or 236 will be energized causing the motor 25 to rotate. In series with either of these coils there is also connected a line 238 to which is connected both the coil 132 for energizing the magnetic clutch and also coil 146 which is adapted to deenergize the circuit to the loud speaker by opening switch 166.

The operation of this device is therefore as follows:

Assuming first that the disks are not set in any predetermined position but that the device has been connected to the set, in order first to position the disks so that desired stations will appear when the particular buttons are pressed, the button 180A is first pressed down. This will close an obvious energizing circuit for the associated relay 82 which will close switch 212A. Assuming further that the armatures 84 are all in their upper or deenergized position, all of the switches 214A—F will be closed and therefore relay 148 is immediately energized through the following circuit: 208, 180A, 210A, 212A, 214A, 215, 214B through 214F, relay 148 and 219 to ground. This will cause the relay 148 to attract its armature and close switches 168.

When this occurs, which will be immediately, the button 180A may be released for a holding circuit for the relay 82 energized has been completed as follows: source of power, line 216 switches 168, lines 218, 212A, relay 82 to ground and also this same circuit plus the additional series line through switches 214A—F in series maintains the relay 148 energized so that switches 168 remain closed. With the closing of switches 168 we also complete a circuit to one of the valves 156—158 and since we are now assuming that switch 180A has been depressed, the circuit will depend upon the rotating disk 56A, and since the left hand spring 76 is in contact and switch 220A is now closed, since relay 82 is energized but armature 84 is not in its completely lowered position (see Figure 7 for position of switches), the following circuit is completed: line 216, switch 168, line 228, relay coil 156, line 240, switch 220A, spring 76, disk 56A to ground. This will energize coil 156 closing switch 226 and complete an energizing circuit to the motor coil 236 and also to coils 132 and 146, the latter two coils energizing the magnetic clutch and deenergizing the speaker circuit respectively.

This will cause the motor to rotate in a direction having the shortest distance between the control notch 60 and the tongue 92 of the armature 84 and when those are in line the pull of the associated magnet 82 will cause the tongue to project into the notch which will cause a stopping of the disk mechanically and also at the same time break the circuit for the coil 148 through the opening of the switch 214A. (This position is best shown in Figure 8.) Therefore the device stopping in this position will now be ready for setting. Since the holding circuit for coil 148 is now deenergized the armature 84 will be retracted by the associated spring and in order to set this disk in its proper position on the shaft and lock it in the position that it now occupies to manually turn the shaft within the disk to place it in its proper tuning position. we depress the button 180A and hold the same down which will hold the tongue 92 within the notch 60. Then turning the manual control button 198 we bring the set to the proper tuned position and when it has reached this position we may release button 180A as the control disk 56A is now set for that desired station. The same is repeated for the rest of the buttons, the buttons being held down until the tongue 92 has entered the notch 60 for each disk and then the manual means tunes the set to the desired station by moving the shaft with respect to the disks since the latter are mounted thereon frictionally.

After the mechanism has thus been set it is only necessary to manually depress the particular button 180 desired which will close the circuit to the relay 82 and also to the holding magnet 148. The motor will then start to rotate in the direction predetermined by the position of the disk 56 involved which will turn until the tongue and notch are in engagement and the falling into the notch will cause a breakage of the holding circuit which will stop the tuning means in the desired position.

Since the magnet 132 is only energized when the system is operated, the set may be manually tuned by the ordinary control 198 at any time without affecting in any way the automatic circuit. This system also has the advantage that the control disk always causes the circuit to find the shortest route of rotation to the tuning point rather than have to always go in one direction and having a return switch to be thrown at the end. It of course always has the further advantage, which is obvious, that it is not necessary to gain admission to the interior of the tuning device in order to set up a different station but merely by a depression of the button 180 involved which is held down until the manual means can be turned to the new station.

We claim:

1. In a tuning device for a radio receiving set, a rotatable shaft, motive means for driving said shaft, a plurality of substantially circular axially spaced conductive disks adjustably mounted on the shaft, an insulating insert in the periphery of each of the disks, a plurality of circumferentially spaced switch arms mounted to bear against the periphery of each disk, said switches formed thereby controlling the motive means to index the rotatable shaft, camming means on each disk surface, followers for each cam, magnetic means for biasing the followers toward the disk and a plurality of switches mounted adjacent each follower, said switches being operated by follower movement and in conjunction with the first-named switches controlling the motive means.

2. In a tuning device for a radio receiving set for automatically indexing the set to certain predetermined points for reception, a tuning shaft, a motor for driving the same, a control shaft connected thereto, a plurality of disks of conducting material frictionally mounted on the control shaft and axially spaced, there being one disk for each predetermined point of index, a peripheral arcuate insert of insulating material in each disk, a cam surface in the periphery of each disk, a plurality of circumferentially spaced switch arms bearing on each disk periphery to form switching means therewith, a follower for the camming portion of each disk, a series of switches mounted adjacent each follower and adapted to be actuated by follower movement, means for individually moving each follower into engagement with its disc, each of the latter set of switches in conjunction with the switches formed by the switch arms adapted to control the indexing of the motor.

3. In an indexing device, a rotatable shaft which it is desired to index to different angular positions, means for rotating the shaft connected thereto, a plurality of discs frictionally mounted on said shaft, said discs formed of an electrical conducting material, peripheral insulating inserts in said discs, a plurality of switch arms mounted to bear against each disc to form switching means therewith, a camming contour also provided in the periphery of each disc, a pivoted cam follower for each disc and a plurality of switches operated by the movement of each follower, means for individually moving each follower into engagement with its disc, said cam operated switches and said arm switches both connected to control the energization of the shaft rotating means to stop it at predetermined points.

4. In an indexing device, a rotatable shaft which it is desired to index to a plurality of different angular positions, energizable means to rotate said shaft connected thereto, a plurality of axially spaced discs frictionally mounted on the shaft, said discs formed of conducting material, insulating inserts in the periphery and cam means also in the periphery of each, follower means cooperating with the cam means, means to bias the follower means individually toward the cams, switch arms mounted to bear against the discs to form switch means therewith and further switch means mounted to be actuated by the follower cam means, all of the switching means connected to control the shaft rotating means.

5. In an indexing device, a rotatable shaft which it is desired to index to a plurality of different angular positions, energizable means to rotate said shaft, a plurality of axially spaced adjustably mounted metallic discs having an irregular peripheral outline on said shaft, insulating inserts in said discs, switch arms adapted to bear against each disc and cam followers also mounted to engage the disc periphery means to bias the follower means individually toward the discs, switch means mounted adjacent to each cam follower whereby each disc will operate switch means directly and indirectly, all of the switching means controlling the operation of the energizable means.

6. In an indexing device, a rotatable shaft which it is desired to index to different angular positions, means for rotating the shaft connected thereto, a plurality of discs frictionally mounted on said shaft, said discs formed of an electrical conducting material, peripheral insulating inserts in said discs, a plurality of switch arms mounted to bear against each disc to form switching means therewith, a camming contour also provided in the periphery of each disc, a pivoted cam follower for each disc and a plurality of switches operated by the movement of each follower, magnetic means for biasing said cam followers toward said discs, said cam operated switches and said arm switches both connected to control the energization of the shaft rotating means to stop it at predetermined points.

ROBERT H. HILL.
EDWARD M. CLAYTOR.